(No Model.)
O. D. & M. A. KLEINSTEUBER.
ELECTRIC DISTRIBUTION BOX.
No. 522,664. Patented July 10, 1894.
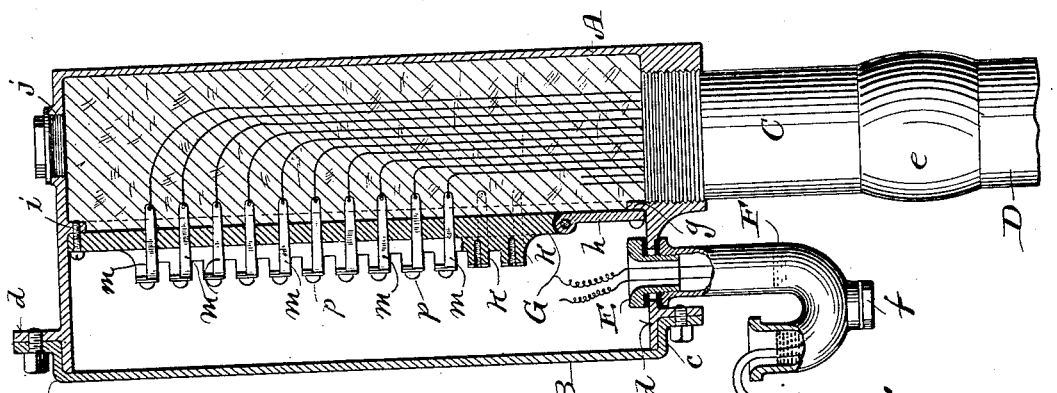
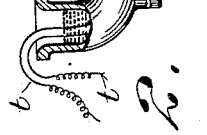
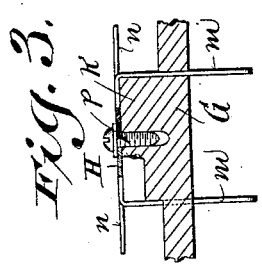
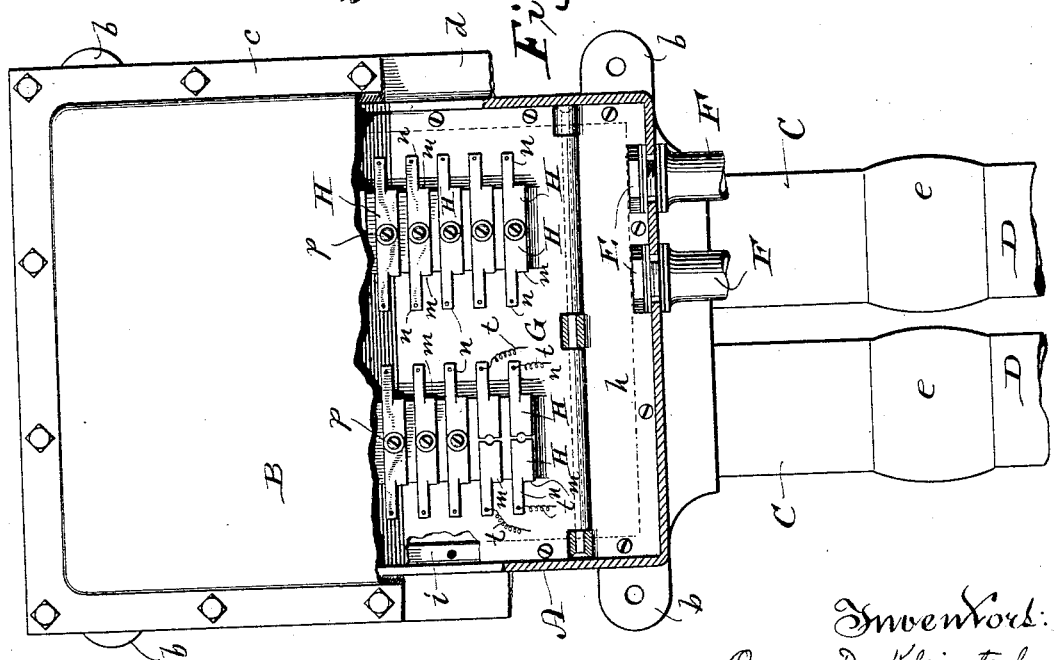
Witnesses
Geo. W. Young.
N. E. Oliphant.
Inventors:
Oscar D. Kleinsteuber,
Monroe A. Kleinsteuber,
By H. G. Underwood
Attorneys

UNITED STATES PATENT OFFICE.

OSCAR D. KLEINSTEUBER AND MONROE A. KLEINSTEUBER, OF MILWAUKEE, WISCONSIN, ASSIGNORS OF ONE-THIRD TO JOHN T. JANSSEN, OF SAME PLACE.

ELECTRIC DISTRIBUTION-BOX.

SPECIFICATION forming part of Letters Patent No. 522,664, dated July 10, 1894.

Application filed April 5, 1894. Serial No. 506,436. (No model.)

*To all whom it may concern:*

Be it known that we, OSCAR D. KLEINSTEUBER and MONROE A. KLEINSTEUBER, citizens of the United States, and residents of Milwaukee, in the county of Milwaukee, and in the State of Wisconsin, have invented certain new and useful Improvements in Electric Distribution - Boxes; and we do hereby declare that the following is a full, clear, and exact description thereof.

Our invention has for its object to improve the electric distribution box set forth in Patent No. 515,087, of February 20, 1894, issued to us, assignors of one-third to John T. Janssen; and it consists in certain peculiarities of construction and combination of parts hereinafter set forth with reference to the accompanying drawings and subsequently claimed.

In the drawings: Figure 1 represents an elevation of our improved electric distribution-box partly broken away and in section; Fig. 2, an irregular longitudinal section of the same; Fig. 3, a detail transverse section illustrating an insulating-base and a pair of electrically connected contact-sections embodied in said distribution box, and Fig. 4, a perspective view of contact-sections having a different electric-connection than is shown in the preceding figures.

Referring by letter to the drawings A represents a box made from any suitable material, preferably cast - metal as a matter of economy, and provided with apertured ears *b* or other convenient means for its attachment to a support. One side of the box consists of a removable cover B, and this cover is preferably provided with a right-angle flange *c* for bolt or screw-connection with a parallel flange *d* on said box. If desirable any suitable packing material may be interposed between said flanges to make a waterproof joint. The bottom of the box is shown as provided with tapped openings for screw-threaded nipples C engaged by electric cables D and these nipples and cables are united by solder-joints *e* as herein shown. The box-bottom is also provided with apertures for hollow nut-headed and screw-threaded couplings E that engage with suitable traps F, water - proof washers or packing being arranged on said box-bottom to face the heads of the couplings and upper ends of the traps. Each trap is provided with an opening in its bend, and a screw-cap *f* or other suitable device is employed as a closure for said opening.

In rear of the trap-couplings, the bottom of the box is shown as provided with a vertical ledge *g* to which is attached a support *h* for a hinged plate or base G of suitable insulating-material, and by means of screws this insulating-base is made fast to other ledges *i* projecting in from the sides and top of the box. While we have shown a hinged insulating-base this is merely a matter of convenience, our main object being to provide such a base as may be readily brought out of normal position for the purpose of facilitating electric-connections hereinafter specified, hence it is obvious that the same result may be arrived at in various ways, as for example said base may be of such dimensions as to be detachably connected to all of the box-ledges.

In the patent above named we showed insulating-compound intermediate of the insulating-base and box-cover but in the present box we omit this compound and depend on dead air-space intermediate of said base and box-cover to increase the insulation, but in rear of the aforesaid base we prefer to fill the box with suitable soluble insulating material or compound run in through a capped opening *j* at the top of said box, this filling being done after the cable-connections hereinafter specified have been completed.

The insulating base G is herein shown as provided with ribs *k* in parallel series and by means of these ribs the dead-air space is increased. Run through corresponding openings in the insulating-base adjacent to the ends of the ribs thereon are arms *m* of contact-sections H arranged in pairs to rest on said ribs, and other arms *n* extend from these contact-sections at right angles to the arms aforesaid.

Various means may be employed to electrically connect each pair of contact-sections and as one of these means we show an electric-conductor or circuit-closer in the form of a metallic plug or screw *p* engaging recesses in opposing ends of said sections and another recess in the insulating base. In Fig. 4, we show a plate *r* joined at its ends to a pair of contact-sections, by screws *s*, and it follows that a wire joined to the screws may be substituted for said plate, as a means for electrically connecting said contact sections.

In practice the strands of one cable are electrically connected to the arms $m$ of one series of contact-sections and the strands of another cable are likewise connected to similar arms of another series of said contact-sections paired with those aforesaid. The other arms $n$ of the paired contact-sections are for connection with wires $t$ joined to telephones or other electric instruments and run through the traps F, moisture being excluded from the box by soluble insulating material or compound poured into said traps, and whenever necessary or desirable the aforesaid traps may be drained through the normally closed openings in their bends. Normally the opposing ends of each pair of contact-sections are electrically united and whether or not this union is maintained depends entirely on the manner in which the telephones or other instruments are brought into circuit with the cable-system of which our distribution-box forms a part, as said instruments may be in loop, bridge or other possible connection with the contact-sections.

Having now described our invention, what we claim as new, and desire to secure by Letters Patent, is—

1. A suitable box, an insulating-base arranged therein, and a series of pairs of contact-sections having arms extended through the insulating-base to be electrically connected with strands of cables, each pair of contact-sections being electrically connected or disconnected at will, substantially as set forth.

2. A suitable box, an insulating-base arranged therein, a series of pairs of contact-sections having arms extended through said base to be electrically connected with strands of cables, and a circuit-closer detachably uniting the opposing ends of each pair of said contact-sections, substantially as set forth.

3. A suitable box, an insulating-base arranged therein, a series of pairs of contact-sections arranged on the base for individual electric-connection with strands of cables, and an electric-conductor removably arranged between opposing ends of each pair of said contact-sections, substantially as set forth.

4. A suitable box, an insulating-base arranged therein, a series of pairs of contact-sections arranged on the base for individual electric-connection with strands of cables, and an electric-conductor removably engaging said base in touch with opposing ends of each pair of contact-sections thereon, substantially as set forth.

5. A suitable box, an insulating-base arranged therein, a series of pairs of contact-sections arranged on the base for individual electric-connection with strands of cables, and a metallic screw run into said base against opposing ends of each pair of contact-sections thereon, substantially as set forth.

6. A suitable box, an insulating-base arranged therein, a series of pairs of contact-sections arranged on the base for individual electric-connection with strands of cables, and an electric-conductor removably engaging recesses in opposing ends of each pair of contact-sections, substantially as set forth.

7. A suitable box, an insulating-base arranged therein and provided with a series of ribs, a series of contact-sections arranged in pairs on said ribs to be electrically connected to strands of cables, and an electric-conductor detachably uniting opposing ends of each pair of said contact-sections, substantially as set forth.

8. A suitable box, an insulating-base arranged in the box to be readily brought out of normal position, and a series of pairs of contact-sections arranged on said base for electric connection with strands of cables, each pair of contact-sections being electrically connected or disconnected at will, substantially as set forth.

9. A suitable box, provided with bent traps for the passage of instrument-wires, an insulating-base arranged in the box, and a series of pairs of contact-sections on the base for electric-connection with cable strands and said instrument wires, each pair of said contact-sections being electrically connected or disconnected at will, substantially as set forth.

10. A suitable box having its bottom provided with openings hollow screw-couplings run through the openings, bent-traps engaging the couplings, an insulating base in the box, and a series of pairs of contact-sections arranged on the base for connection with cable-strands, each pair of said contact-sections being electrically connected or disconnected at will, substantially as set forth.

11. A suitable box provided at its bottom with suitable openings having cable-engaging nipples depending therefrom, an insulating-base in the box in front of the cable-nipples, bent traps joined to the box-bottom in front of the insulating base, a normally closed opening in the top of said box in rear of said insulating-base, and a series of pairs of electrically connecting and disconnecting contact-sections arranged on the aforesaid base for electric connection with cable-strands, substantially as set forth.

12. A suitable box, an insulating-base arranged therein, a series of pairs of contact-sections arranged on the base, each of these contact-sections being provided with arms at right-angles to each other, and an electric conductor detachably uniting the opposing ends of each pair of said contact-sections, substantially as set forth.

In testimony that we claim the foregoing we have hereunto set our hands, at Milwaukee, in the county of Milwaukee and State of Wisconsin, in the presence of two witnesses.

OSCAR D. KLEINSTEUBER.
MONROE A. KLEINSTEUBER.

Witnesses:
N. E. OLIPHANT,
HENRY DANKERT.